(12) United States Patent
Linke et al.

(10) Patent No.: US 8,167,607 B2
(45) Date of Patent: May 1, 2012

(54) APPARATUS FOR BLOW MOLDING CONTAINERS, COMPRISING TRANSPORT ELEMENTS WITH TWO GRIPPER ARMS

(75) Inventors: Michael Linke, Hamburg (DE); Michael Litzenberg, Geesthacht (DE); Rolf Baumgarte, Ahrensburg (DE); Frank Lewi, Tangstedt (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 282 days.

(21) Appl. No.: 12/223,199

(22) PCT Filed: Jan. 11, 2007

(86) PCT No.: PCT/DE2007/000053
§ 371 (c)(1),
(2), (4) Date: Jun. 7, 2010

(87) PCT Pub. No.: WO2007/085226
PCT Pub. Date: Aug. 2, 2007

(65) Prior Publication Data
US 2010/0278959 A1    Nov. 4, 2010

(30) Foreign Application Priority Data
Jan. 24, 2006    (DE) .......................... 10 2006 003 142

(51) Int. Cl.
*B29C 49/68* (2006.01)
*B29C 31/08* (2006.01)
(52) U.S. Cl. .................. 425/526; 198/470.1; 198/803.7; 294/99.1; 294/106; 425/534

(58) Field of Classification Search ............... 198/470.1, 198/803.7; 294/99.1, 106; 425/526, 534
See application file for complete search history.

(56) References Cited

U.S. PATENT DOCUMENTS

| | | | | |
|---|---|---|---|---|
| 2,857,044 A * | 10/1958 | Mullan | ...................... | 198/803.7 |
| 3,590,982 A * | 7/1971 | Banyas | ...................... | 198/470.1 |
| 4,093,296 A | 6/1978 | Itoh | | |
| 4,890,716 A * | 1/1990 | Kitamura | .................. | 198/346.1 |
| 5,201,501 A * | 4/1993 | Fassler | ............................ | 269/32 |
| 6,513,643 B2 * | 2/2003 | Nakada | ........................ | 198/379 |
| 6,612,634 B1 * | 9/2003 | Zoppas | ........................ | 294/106 |

FOREIGN PATENT DOCUMENTS

| | | |
|---|---|---|
| DE | 278 980 | 5/1990 |
| DE | 693 02 333 | 10/1996 |
| DE | 297 16 268 | 11/1998 |
| DE | 299 16 842 | 12/2000 |

(Continued)

*Primary Examiner* — Robert B Davis
(74) *Attorney, Agent, or Firm* — Lucas & Mercanti, LLP; Klaus P. Stoffel

(57) ABSTRACT

The apparatus serves for blow molding containers. Preforms of a thermoplastic material are heated in the region of a heating zone and subsequently transferred to a blow molding device. The blow molding device is provided with at least one blow molding station for transforming the preforms into the containers. Provided for handling the preforms is a gripper-like transporting element (41) with two gripper arms (45, 46), which are arranged pivotably in relation to a gripper carrier (42). Each of the gripper arms can be pivoted by means of at least one lever and is coupled with a central element (49). The central element is arranged at least partly between the gripper arms. Each of the gripper arms is resiliently clamped with respect to the central element by at least one spring (56, 57).

13 Claims, 7 Drawing Sheets

FOREIGN PATENT DOCUMENTS

| | | |
|---|---|---|
| EP | 10 54 826 | 1/2002 |
| EP | 11 83 146 | 11/2002 |
| EP | 1 375 395 | 1/2004 |
| FR | 27 20 679 | 12/1995 |
| FR | 2 730 659 | 8/1996 |
| JP | 53 102375 | 9/1978 |
| JP | 11-105 116 | 4/1999 |
| WO | 03/099688 | 12/2003 |

\* cited by examiner

APPARATUS FOR BLOW MOLDING CONTAINERS, COMPRISING TRANSPORT ELEMENTS WITH TWO GRIPPER ARMS

The invention concerns an apparatus for blow molding containers, which has a heating line for heating preforms made of a thermoplastic material and is provided with a blowing system, which has at least one blowing station for shaping the preforms into containers, and in which at least one gripper-like transport element with two gripper arms is provided for handling the preforms, said gripper arms being mounted in a way that allows them to swivel relative to a gripper carrier.

In container molding by the action of blowing pressure, preforms made of a thermoplastic material, for example, preforms made of PET (polyethylene terephthalate), are fed to different treatment stations within a blow-molding machine. A blow-molding machine of this type typically has a heating system and a blowing system, in which the preform, which has first been brought to a desired temperature, is expanded into a container by biaxial orientation. The expansion is effected by means of compressed air, which is introduced into the preform to be expanded. DE-OS 43 40 291 explains the process-engineering sequence in this type of preform expansion. The aforementioned introduction of compressed gas also comprises the introduction of compressed gas into the developing container bubble and the introduction of compressed gas into the preform at the beginning of the blowing operation.

The basic design of a blowing station for container molding is described in DE-OS 42 12 583. Possible means of bringing the preform to the desired temperature are explained in DE-OS 23 52 926.

Various handling apparatus can be used to convey the preforms and the blow-molded containers within the blow-molding apparatus. The use of transport mandrels, onto which the preforms are slipped, has proven especially effective. However, the preforms can also be handled with other supporting apparatus. Other available designs involve the use of grippers for handling the preforms and the use of expanding mandrels, which can be inserted in the mouth region of the preform to support the preform.

The handling of containers and preforms with the use of transfer wheels is described, for example, in DE-OS 199 06 438 with one transfer wheel arranged between a blowing wheel and a delivery line and another transfer wheel arranged between the heating line and the blowing wheel.

The above-explained handling of the preform occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other by linear displacement or in some other way. In stationary blowing stations, which are suitable especially for accommodating several cavities for container molding, plates arranged parallel to one another are typically used as mold supports.

Grippers can be used for handling preforms either exclusively or in combination with other support or handling elements. For example, the preforms can be supported by transport mandrels along a portion of their transport path and can be handled with the use of grippers along at least one other portion of their transport path. However, the grippers that have been used in the past cannot meet all of the requirements that are placed on them with respect to preform handling that is protective and at the same time reliable.

The basic requirements are reliable and trouble-free handling of the preforms at high preform conveyance rates per unit time. It would be advantageous for the grippers to be suitable both for handling preforms and for handling blown containers. Moreover, mechanical damage of the preforms as a result of their handling by the grippers must be avoided or minimized.

The objective of the invention is to design an apparatus of the type described at the beginning in a way that is conducive to reliable transport of the preforms at a high transport speeds.

In accordance with the invention, this objective is achieved in such a way that each of the gripper arms is coupled by at least one lever with a central element in such a way that it can swivel, said central element being arranged at least partly between the gripper arms, and that each of the gripper arms is elastically clamped relative to the central element by at least one spring.

The arrangement of the central element between the gripper arms allows automatic closing of the gripper arms directly by insertion of the preform between the gripper arms and pressure on the central element that results from this. It is likewise possible in a simple way to position the central element for release of the preform and in this way to carry out both a swiveling open movement of the gripper arms and delivery of the preforms.

The preceding and following description of the handling of the preforms with the use of the gripper arms also refers in the same way to the handling of blown containers, so that there is no need to point this out separately each time. The elastic clamping of the gripper arms relative to the central element helps to achieve automatic support of the preforms and bottles without the use of separate locking mechanisms or active actuating elements.

It is conducive to a simple kinematic coupling if the levers are arranged obliquely to a central longitudinal axis of the central element.

In particular, it is proposed that the levers be arranged pointing obliquely forward in a direction facing away from the gripper carrier.

Stabilization of predetermined positionings of the gripper arms is promoted if the springs are arranged with their longitudinal axes oblique to the central longitudinal axis.

It has been found to be especially advantageous for the longitudinal axes of the springs to be arranged pointing obliquely forward in a direction facing away from the gripper carrier.

To realize a compact design, it is useful for the central element to be movably supported relative to the gripper carrier.

High mechanical stability in a closed state can be realized if the central element has a step-like contour in a lateral region and if the gripper arms have an outer contour that is adapted to the contour of the central element.

Protective handling of the preforms is promoted if the gripper arms have a holding contour that is adapted to the preform in the region of the extension of the gripper arms that faces away from the gripper carrier.

It is likewise conducive to simple controllability and protective handling of the preforms if the central element has a contact surface that is adapted to the external geometry of the preform in the region of the extension of the central element that faces away from the gripper carrier.

External controllability of the transport element is realized if the central element has a receiver that is adapted to a cam control mechanism.

To realize a simple mechanical design, it is helpful if the cam control mechanism is designed exclusively for presetting an opening movement of the transport element.

Stabilization of the state in a holding position of the transport element is achieved by arranging the longitudinal axis of the spring in a closed state of the transport element obliquely to the longitudinal axis of the lever in such a way that the longitudinal axis of the spring extends at least partly between the longitudinal axis of the lever and the central longitudinal axis.

Stabilization of the state in an open position of the transport element is achieved if the longitudinal axis of the spring in an open state of the transport element extends at least partly on the outside relative to the central longitudinal axis alongside the longitudinal axis of the lever.

Specific embodiments of the invention are schematically illustrated in the drawings.

Figure 1:
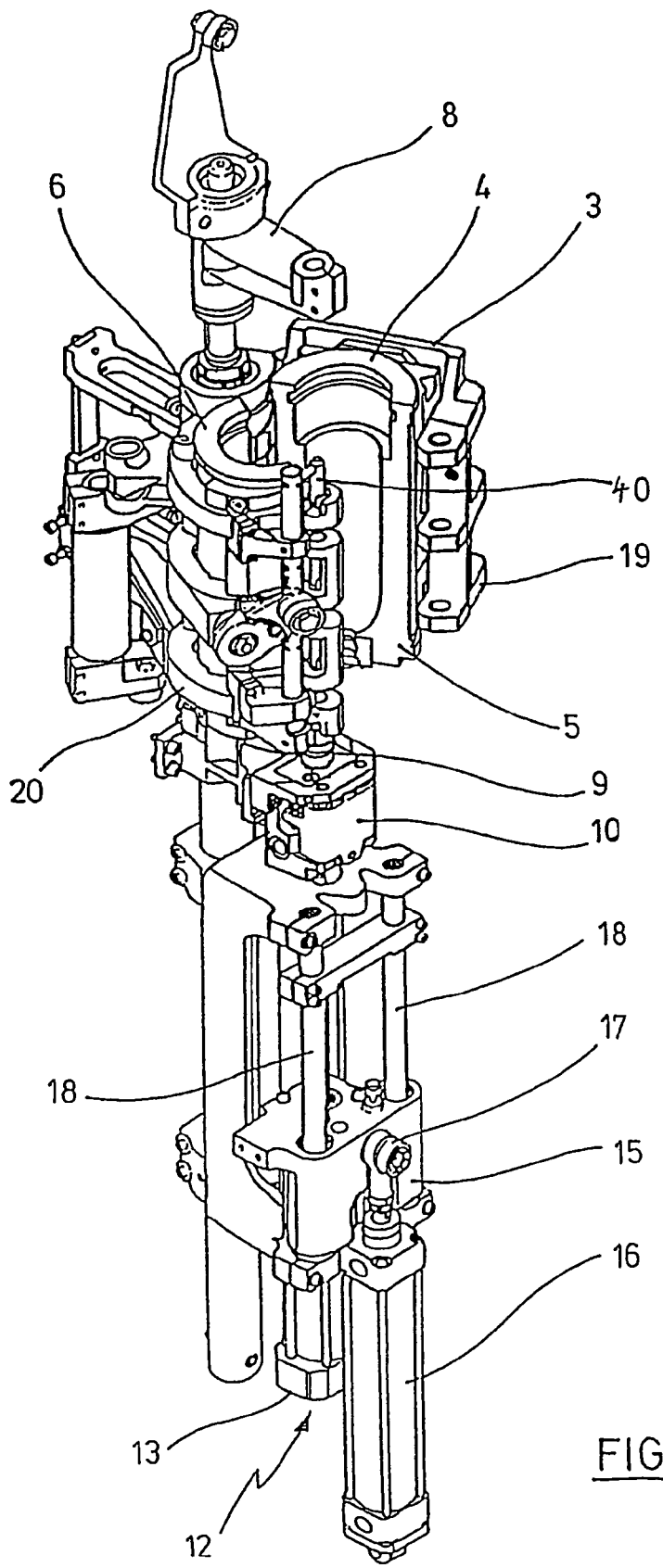
FIG. 1 shows a perspective view of a blowing station for producing containers from preforms.
Figure 2:
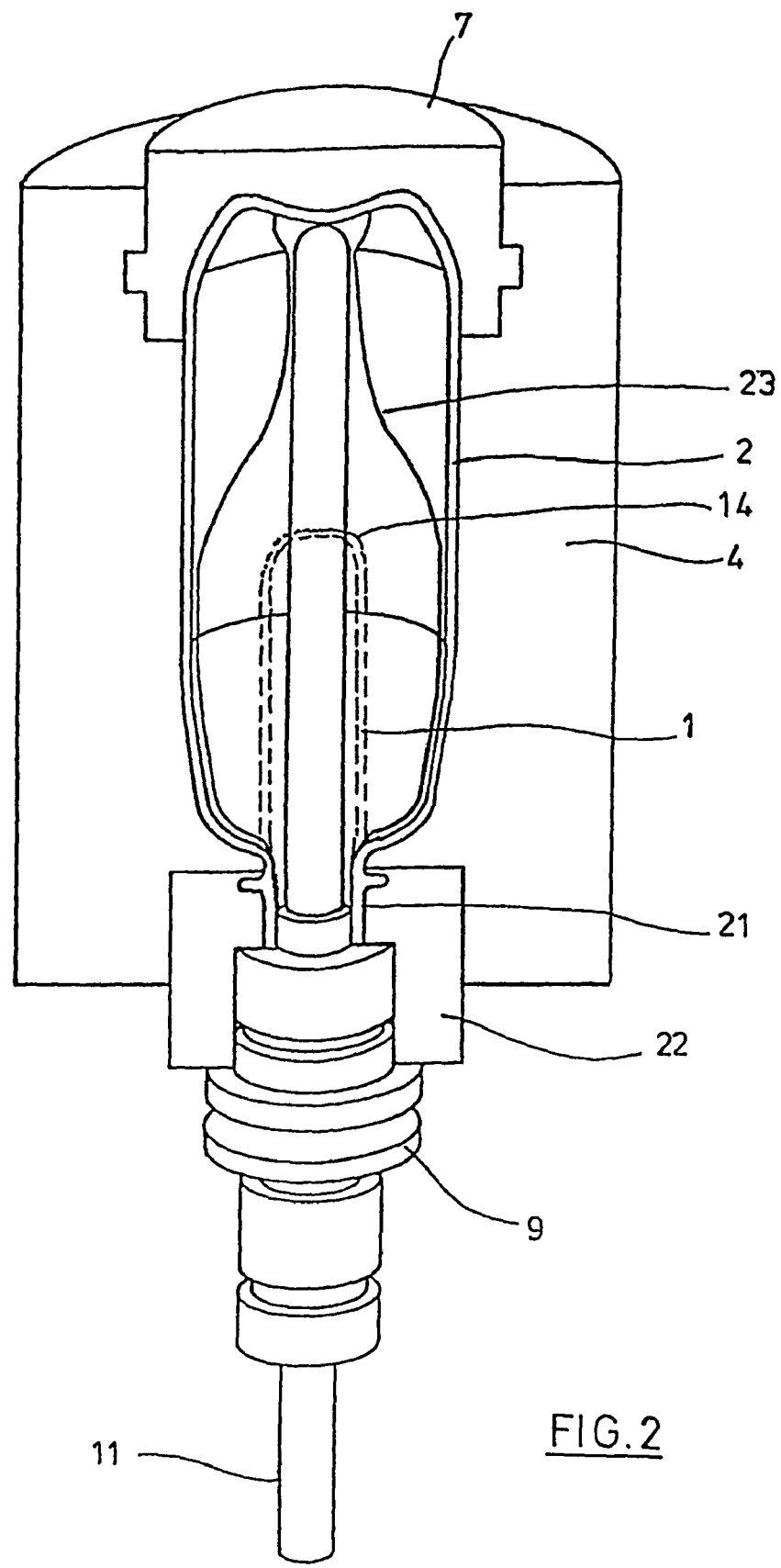
FIG. 2 shows a longitudinal section through a blow mold, in which a preform is stretched and expanded.

FIGS. 1 and 2 show the basic design of an apparatus for shaping preforms 1 into containers 2. The apparatus can be arranged as illustrated or rotated 180° in a vertical plane.

The apparatus for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6, and a base part 7, which can be positioned by a lifting apparatus 8. The preform 1 can be held in place in the area of the blowing station 3 by a holding element 9. It is possible, for example, to insert the preform 1 directly into the blow mold 4 with tongs or other handling apparatus.

To allow compressed air to be fed in, a connecting piston 10 is arranged below the blow mold 4. It supplies compressed air to the preform 1 and at the same time produces a seal. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by means of cam segments, which are acted upon by pickup rollers. The use of cam segments is advantageous especially when a large number of blowing stations 3 is arranged on a rotating blowing wheel 25.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
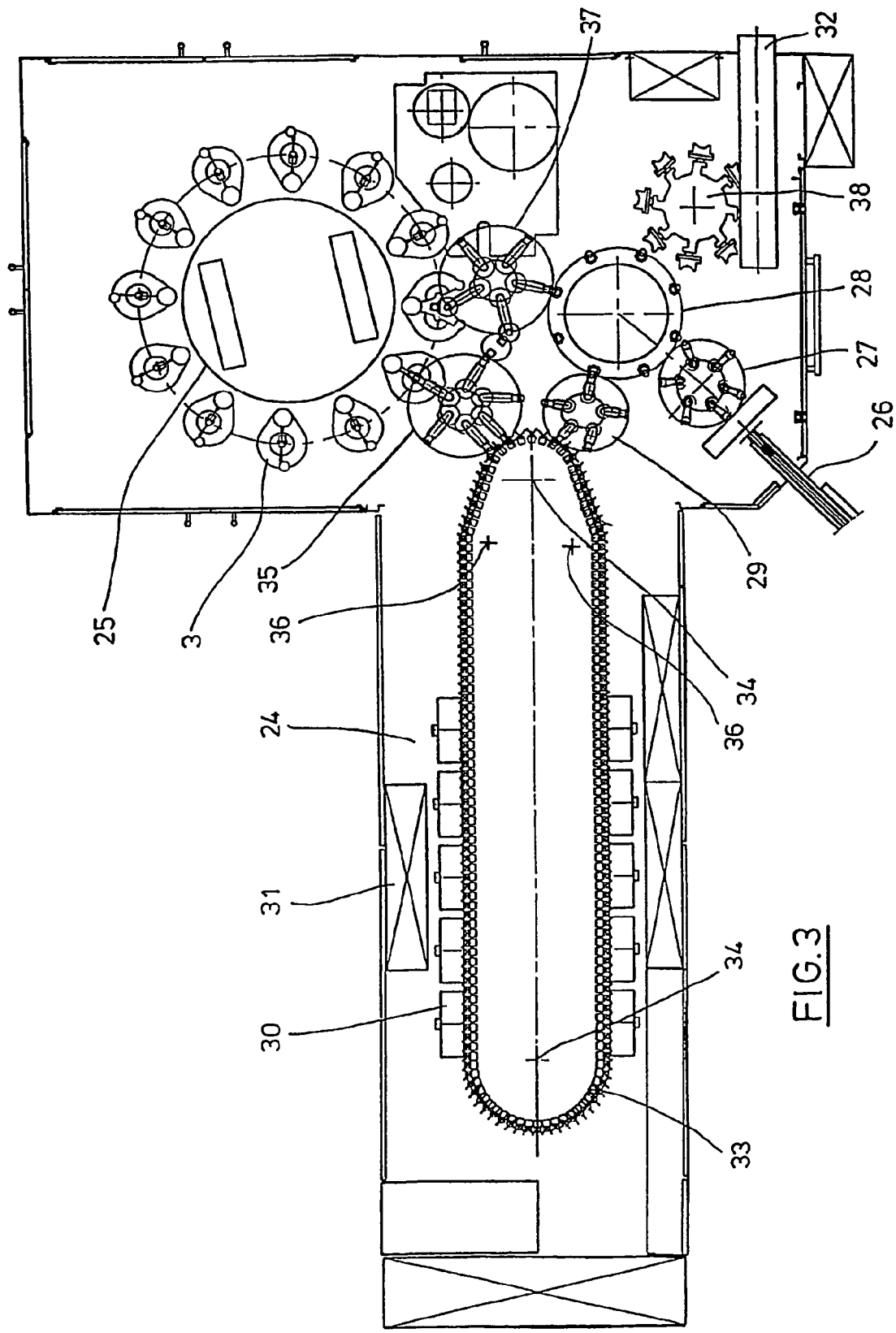
FIG. 3 is a drawing that illustrates a basic design of an apparatus for blow molding containers.

FIG. 3 shows the basic design of a blow-molding machine, which has a heating line 24 and a rotating blowing wheel 25. Starting from a preform feeding apparatus 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by transfer wheels 37, 28, 38.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 27, and two relatively small-sized guide wheels 36 are used in the area of adjacent deflections. In principle, however, any other types of guides are also conceivable.

To allow the closest possible arrangement of the transfer wheel 27 and the blowing wheel 25 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 27 and to the blowing wheel 25. As an alternative to the use of chain-like transport elements 33, it is also possible, for example, to use a rotating heating wheel.

After the blow molding of the containers 2 has been completed, the containers 2 are carried out of the area of the blowing stations 3 and conveyed to the delivery line 32 by the transfer wheel 38.

Figure 4:
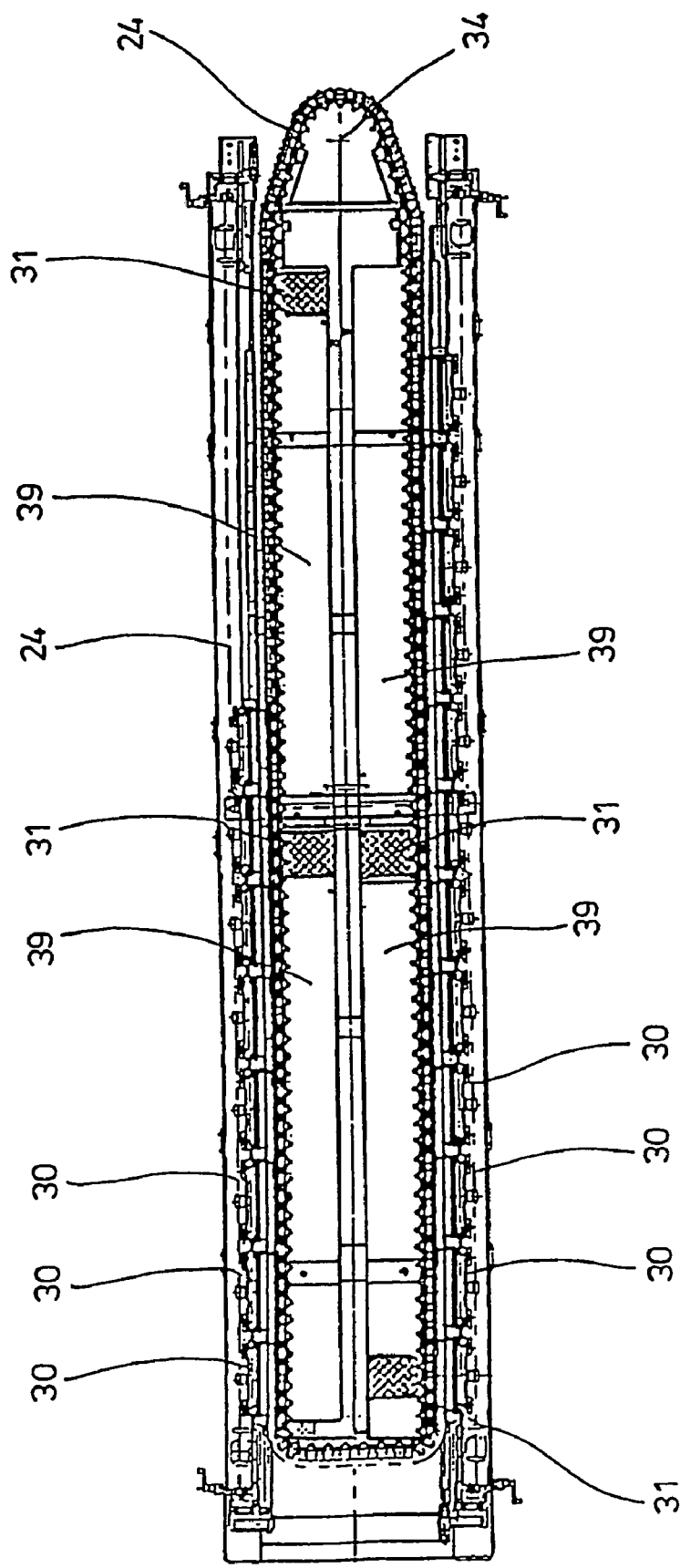
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

The preforms 1 and the containers 2 can be conveyed through the blow-molding machine in a variety of ways. In accordance with one embodiment, the preforms are carried along at least most of their transport path by transport mandrels. However, it is also possible to transport the preforms with the use of grippers, which grip the outside of the preform, or to use expanding mandrels, which are inserted into a mouth section of the preform. Different variants are also conceivable with respect to the spatial orientation of the preforms.

In one variant, the preform is fed into the blow-molding machine in the area of the preform feeding apparatus 26 with its mouth oriented vertically upward. It is then turned, conveyed along the heating line 24 and the blowing wheel 25 with its mouth oriented vertically downward, and turned again before reaching the delivery line 32. In another variant, the preform 2 is heated as it is conveyed along the heating line 24 with its mouth oriented vertically downward but is rotated back by 180° before reaching the blowing wheel 25.

In a third variant, the preform passes completely through the blow-molding machine without any turning operations being performed on it with its mouth oriented vertically upward.

Figure 5:
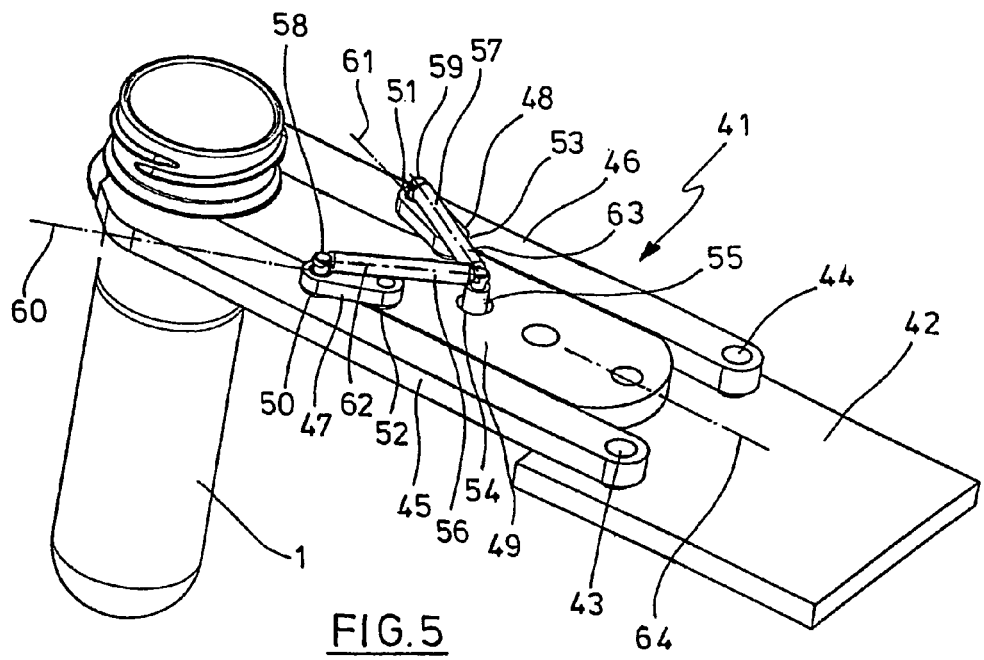
FIG. 5 shows a perspective view of a transport element with two gripper arms and a central element in the closed state of the gripper.

FIG. 5 shows a perspective view of a preform 1 held by a transport element 41 in the form of a gripper. A blow-molded container 2 can be similarly positioned by the transport element 41. The transport element 41 has a gripper carrier 42, which is connected with gripper arms 45, 46 by means of swivel joints 43, 44. The gripper arms 45, 46 are coupled with a central element 49 by levers 47, 48. The levers 47, 48 are connected with the gripper arms 45, 46 by swivel joints 50, 51 and with the central element 49 by swivel joints 52, 53. The central element 49 has a recess 54, into which a holding element 55 that is connected with the gripper carrier 42 is inserted. In an alternative embodiment, the holding element 55 can be integrally connected with the central element 49.

At least one of the swivel joints 43, 44, 50, 51, 52, 53 can be realized as a pin-hole combination, a hinge, a film joint or a solid-body joint. When film joints or solid-body joints are used, it is possible to construct all parts of the transport element 41 with the exception of the springs 56, 57 as integral parts or to combine some of the parts into one or more modules.

The gripper arms 45, 46 are additionally connected with the holding element 55 by springs 56, 57. The springs 56, 57 are preferably designed as tension springs and are mounted by pins 58, 59 in the area of their extension that faces away from the holding element 55. The pins 58, 59 are arranged as extensions of the swivel joints 50, 51.

FIG. 5 shows the transport element 41 in a closed state, in which the preform 1 is held by the gripper arms 45, 46. The gripper arms 45, 46 and the central element 49 are stabilized in the illustrated closed position by the springs 55, 57. It is especially apparent that both the longitudinal axes 60, 61 of the levers 47, 48 and the longitudinal axes 62, 63 of the springs 56, 57 are arranged obliquely to a central longitudinal axis 64. In this regard, with respect to the central longitudinal axis 64, the longitudinal axes 60, 61 of the levers 47, 48 and the longitudinal axes 62, 63 of the springs 56, 57 extend obliquely forward towards the preform 1.

In the embodiment illustrated in FIG. 5, the central longitudinal axis 64 is an axis of symmetry of the transport element 41. In this regard, the central element 49 is arranged between the gripper arms 45, 46, and the gripper arms 45, 46 lie along the sides of the central element 49 in the illustrated closed position.

Figure 6:
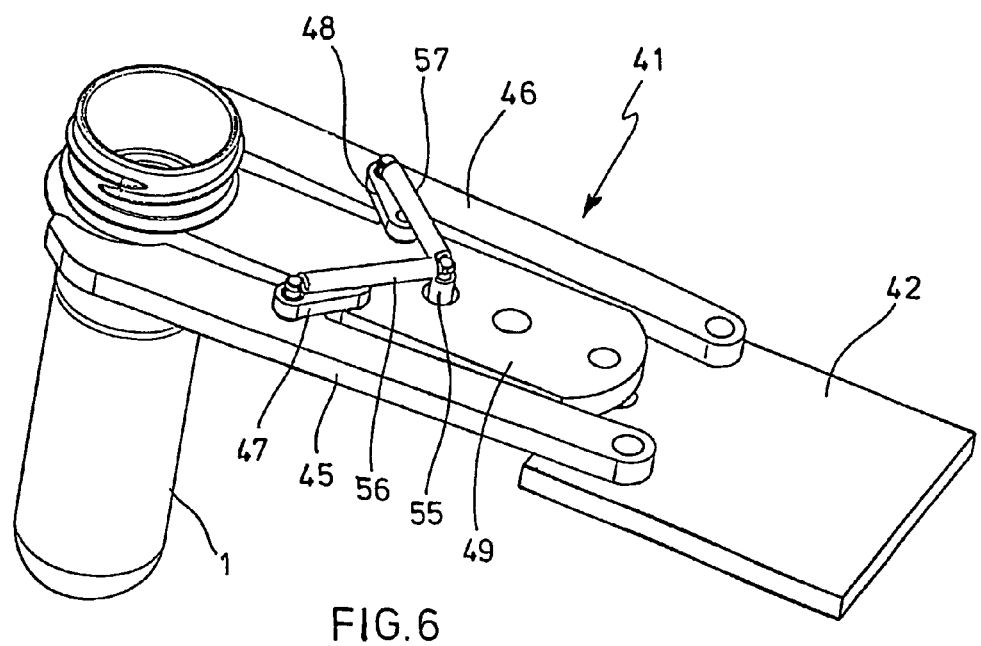
FIG. 6 shows the apparatus according to FIG. 5 after the gripper has been opened.

FIG. 6 shows the apparatus according to FIG. 5 after the gripper arms 45, 46 have opened. In the embodiment shown here, the holding element 55 is rigidly connected with the central element 49 and is displaced together with the central element 49 relative to the gripper carrier 45. The displacement can be effected, for example, by an external cam control mechanism. The positioning movement of the central element 49 causes the levers 47, 48 and thus the gripper arms 45, 46 to swivel and release the preform 1.

Figure 7:
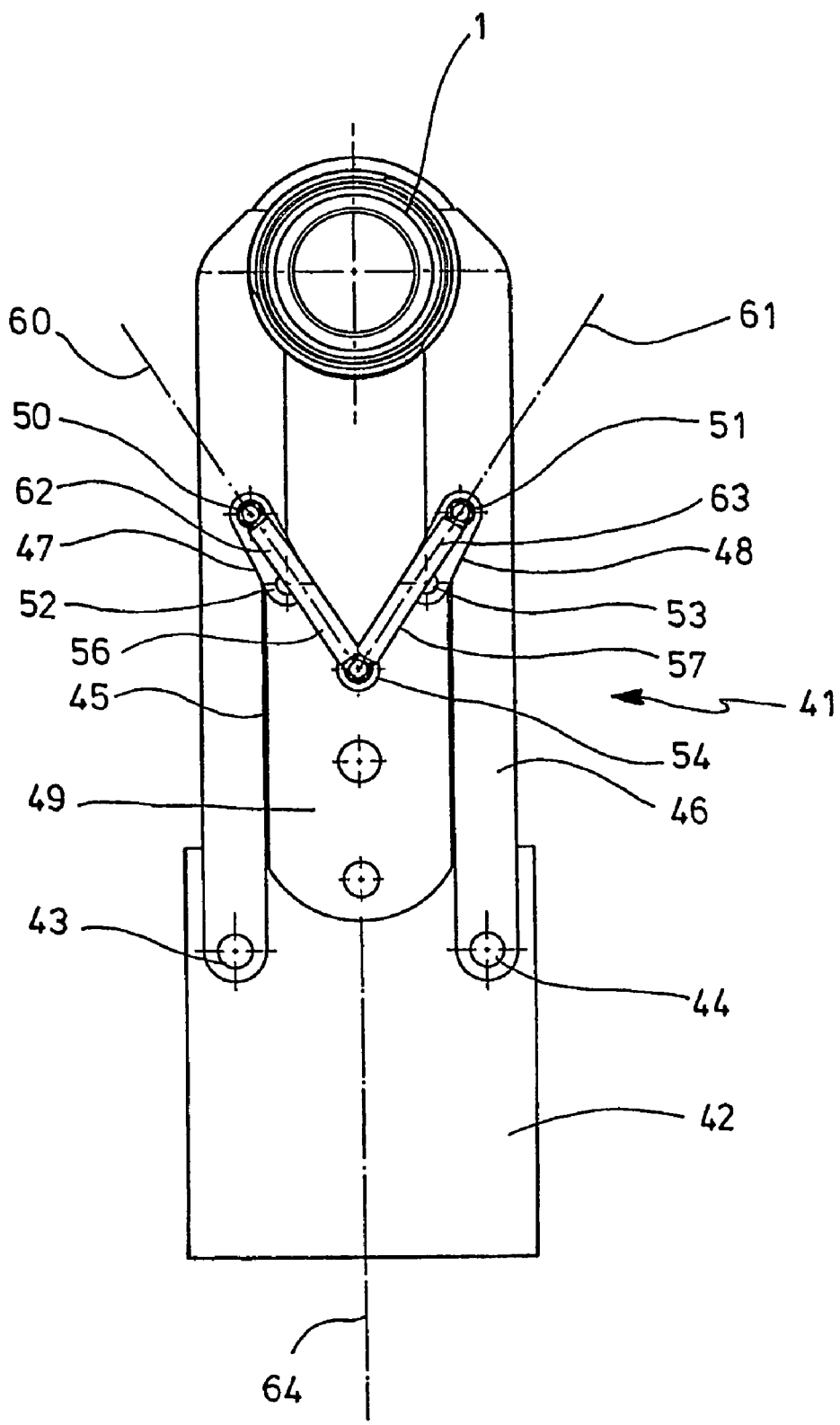
FIG. 7 shows a top view of the apparatus according to FIG. 5.

FIG. 7 provides a further illustration of the principle of operation of the apparatus according to FIG. 5 in a top view. In this drawing, it is especially apparent that the longitudinal axes 60, 61 of the levers 47, 48 and the longitudinal axes 62, 63 of the springs 56, 57 are arranged obliquely to each other. This allows the springs 56, 57 to pull the gripper arms 45, 46 towards the central element 49 and thus allows the transport element 41 to hold the preform 1. In the illustrated position, the levers 47, 48 are located in an over dead center position, so that a displacement of the central element 49 in the direction of the central longitudinal axis 64 that is produced by the spring tension stabilizes the closed state of the transport element 41.

Figure 8:
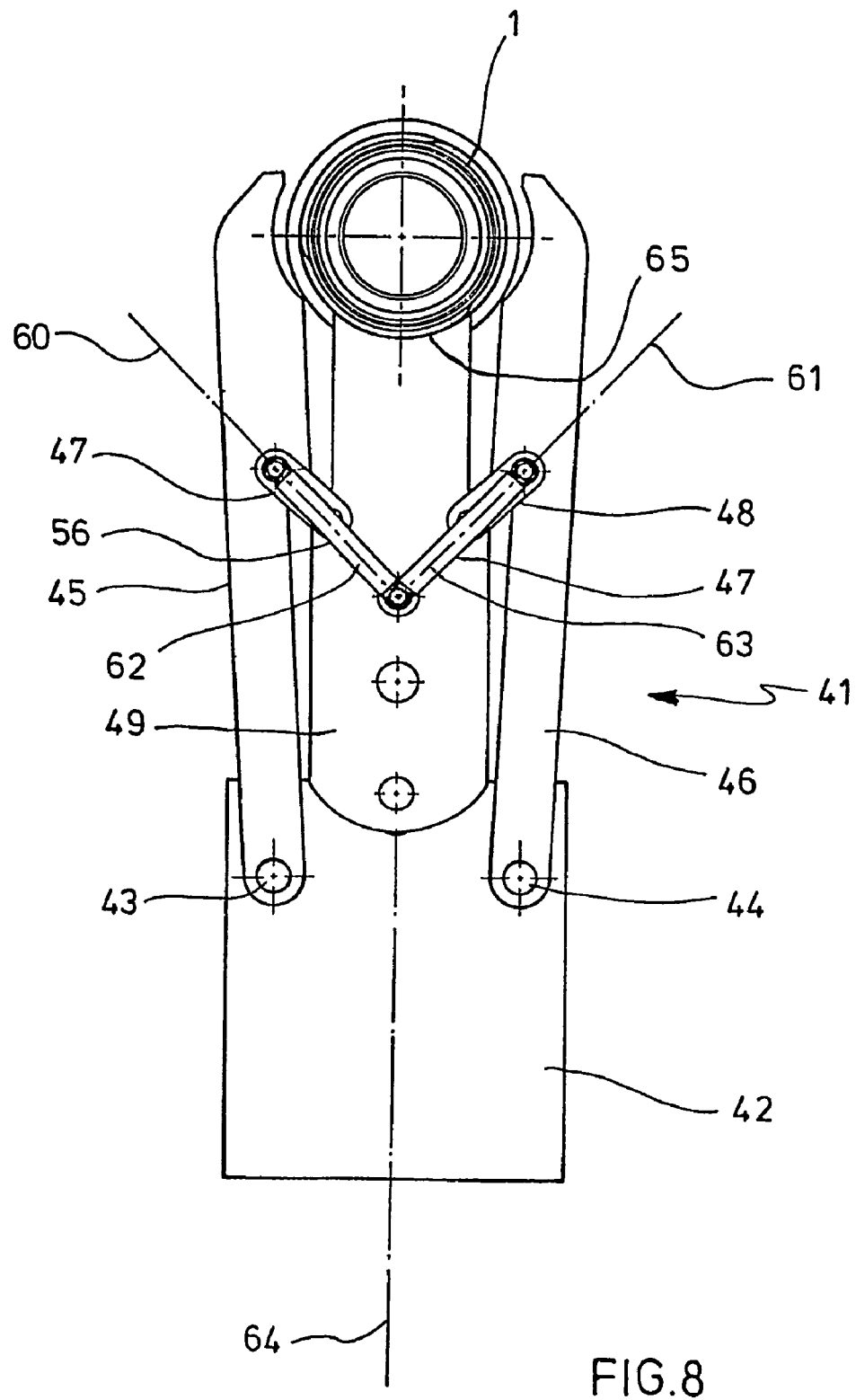
FIG. 8 shows a top view of the apparatus according to FIG. 6.

FIG. 8 shows the apparatus according to FIG. 7 after the transport element 41 has been opened to release the preform 1. In this connection, the central element 49 was displaced in the direction of the central longitudinal axis 64 by an external actuating force, which caused the gripper arms 45, 46 to open via their coupling with the levers 47, 48. In the illustrated position, the longitudinal axes 60, 61 of the levers 47, 48 and the longitudinal axes 62, 63 of the springs 56, 57 are again arranged obliquely relative to each other. With respect to the levers 47, 48, however, the obliquity is present on the opposite sides of the levers 47, 48 compared to the position shown in FIG. 7. Due to the arrangement in FIG. 8 of the longitudinal axes 60, 61 of the levers 47, 48 and the longitudinal axes 62, 63 of the springs 56, 57, the tension of the springs 56, 57 leads to stabilization of the illustrated open position, so that this state is also maintained without the action of external forces.

The design of the transport element 61 illustrated in the drawings thus results in extremely simple control of the transport element 41. Starting from the position shown in FIG. 8, when a preform 1 is inserted, a closing movement can be preset in a simple way by direct pressure contact of the preform 1 on a contact surface 65 of the central element 49. The contour of the contact surface 65 is preferably adapted to the outer contour of the preform in the intended contact area. Relative movements between the preform 1 and the contact surface 65 can be prevented. An extremely small actuating force enables the preform 1 to move the central element 49 towards the gripper carrier 42, and a final closing movement is effected by the tension of the springs 56, 58. Naturally, as an alternative to a direct displacement by the preform 1 or the blow-molded container 2, the central element 49 can also be positioned by a cam control mechanism or other suitable positioning elements.

Conversion of the transport element 41 from the closed state according to FIG. 7 to the open state according to FIG. 8 can also be made with the application of only a small force, since only the first part of the opening movement must be controlled; after the longitudinal axes 60, 61 of the levers 47, 48 and the longitudinal axes 62, 63 of the springs 56, 57 have passed their point of longitudinal alignment, the opening movement is ended by the tension of the springs 56, 57.

This allows symmetric opening/closing movements and avoids frictional effects on the preform 1.

The invention claimed is:

1. An apparatus for blow molding containers, which has a heating line for heating preforms made of a thermoplastic material and is provided with a blowing system, which has at least one blowing station for shaping the preforms into containers, and in which at least one gripper-like transport element with two gripper arms is provided for handling the preforms, said gripper arms being mounted in a way that allows them to swivel relative to a gripper carrier, wherein each of the gripper arms (45, 46) is coupled by at least one lever (47, 48) with a central element (49) in such a way that it can swivel, said central element (49) being arranged at least partly between the gripper arms (45, 46), and where each of the gripper arms (45, 46) is elastically clamped relative to the central element (49) by at least one spring.

2. An apparatus in accordance with claim 1, wherein the levers (47, 48) are arranged obliquely to a central longitudinal axis (64) of the central element (49).

3. An apparatus in accordance with claim 1, wherein the levers (47, 48) are arranged pointing obliquely forward in a direction facing away from the gripper carrier (45).

4. An apparatus in accordance with claim 1, wherein the springs (56, 57) are arranged with their longitudinal axes (62, 63) oblique to the central longitudinal axis (64).

5. An apparatus in accordance with claim 1, wherein the longitudinal axes (62, 63) of the springs (56, 57) are arranged pointing obliquely forward in a direction facing away from the gripper carrier (42).

6. An apparatus in accordance with claim 1, wherein the central element (69) is movably supported relative to the gripper carrier (42).

7. An apparatus in accordance with claim 1, wherein the central element (49) has a step-like contour in a lateral region and that the gripper arms (45, 46) have an outer contour that is adapted to the contour of the central element (49).

8. An apparatus in accordance with claim 1, wherein the gripper arms (45, 46) have a holding contour that is adapted to the preform (1) in the region of the extension of the gripper arms (45, 46) that faces away from the gripper carrier.

9. An apparatus in accordance with claim 1, wherein the central element (49) has a contact surface (65) that is adapted to the external geometry of the preform (1) in the region of the extension of the central element (49) that faces away from the gripper carrier (42).

10. An apparatus in accordance with claim 1, wherein the central element (49) has a receiver that is adapted to a cam control mechanism.

11. An apparatus in accordance with claim 1, wherein the cam control mechanism is designed exclusively for presetting an opening movement of the transport element (41).

12. An apparatus in accordance with claim 1, wherein the longitudinal axis (62, 63) of the spring (56, 57) in a closed state of the transport element (41) is arranged obliquely to the longitudinal axis (60, 61) of the lever (47, 48) in such a way that the longitudinal axis (62, 63) of the spring (56, 57) extends at least partly between the longitudinal axis (60, 61) of the lever (47, 48) and the central longitudinal axis (64).

13. An apparatus in accordance with claim 1, wherein the longitudinal axis (62, 63) of the spring (56, 57) in an open state of the transport element (41) extends at least partly on the outside relative to the central longitudinal axis (64) alongside the longitudinal axis (60, 61) of the lever (47, 48).

* * * * *